(12) United States Patent
Tajima

(10) Patent No.: US 10,625,659 B2
(45) Date of Patent: *Apr. 21, 2020

(54) VEHICLE LAMP

(71) Applicant: KOITO MANUFACTURING CO., LTD., Tokyo (JP)

(72) Inventor: Keiichi Tajima, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/137,661

(22) Filed: Sep. 21, 2018

(65) Prior Publication Data

US 2019/0092219 A1    Mar. 28, 2019

(30) Foreign Application Priority Data

Sep. 25, 2017  (JP) ................... 2017-184218

(51) Int. Cl.
*B60Q 1/068*    (2006.01)

(52) U.S. Cl.
CPC ................... *B60Q 1/0683* (2013.01)

(58) Field of Classification Search
CPC ... B60Q 1/0683; B60Q 2200/32; F21S 41/60; F21S 41/65; F21S 41/25; F21S 41/657
See application file for complete search history.

(56) References Cited

U.S. PATENT DOCUMENTS

| | | | |
|---|---|---|---|
| 8,104,940 B2* | 1/2012 | Ochiai | F21S 41/19 362/512 |
| 8,147,106 B2* | 4/2012 | Eto | B60Q 1/076 362/419 |
| 8,430,540 B2* | 4/2013 | Kikuchi | B60Q 1/0047 362/343 |
| 2015/0117043 A1* | 4/2015 | Shibata | B60Q 1/0683 362/512 |

FOREIGN PATENT DOCUMENTS

JP    2006-315512 A    11/2006

* cited by examiner

Primary Examiner — Peggy A Neils
(74) Attorney, Agent, or Firm — Osha Liang LLP

(57) ABSTRACT

A vehicle lamp includes a lamp body, a lamp, and a leveling actuator. And an aiming screw for aiming the lamp unit in an upper and lower direction is supported to the lamp body to be rotatable about an axis extending in a front and rear direction of the vehicle lamp. And an aiming nut to be threadably engaged with the aiming screw is mounted to the aiming screw. And the leveling actuator includes an actuator body fixed and supported to the lamp unit and an output shaft member supported to the actuator body to be moveable in the front and rear direction of the vehicle lamp with protruding upward or downward from the actuator body. And a leading end portion of the output shaft member and the aiming nut are coupled at a position distant in a right and left direction from a vertical surface including the axis.

7 Claims, 11 Drawing Sheets

VEHICLE LAMP

CROSS-REFERENCE TO RELATED APPLICATIONS

The present application claims the benefit of priority of Japanese Patent Application No. 2017-184218, filed on Sep. 25, 2017, the content of which is incorporated herein by reference.

TECHNICAL FIELD

This invention relates to a vehicle lamp including a leveling actuator.

BACKGROUND

In the related art, a vehicle lamp has been known which includes a leveling actuator configured to rotate a lamp unit, which is supported to a lamp body to be aimable in an upper and lower direction and in a right and left direction, in the upper and lower direction, independently of rotation by the aiming.

JP-A-2006-315512 discloses a configuration of the leveling actuator, in which an output shaft member supported to an actuator main body, which is fixed and supported to the lamp unit, to be moveable in a front and rear direction of the lamp is disposed to protrude toward a lamp rear from the actuator main body.

In the vehicle lamp disclosed in JP-A-2006-315512, an aiming screw for aiming the lamp unit in the upper and lower direction is supported to the lamp body to be rotatable about an axis extending in the front and rear direction of the lamp, and the output shaft member of the leveling actuator is disposed to face toward a leading end portion of the aiming screw on the same axis as the aiming screw.

In the vehicle lamp disclosed in JP-A-2006-315512, since the output shaft member of the leveling actuator is disposed in series with the aiming screw, a summed length of the leveling actuator and the aiming screw in the front and rear direction is lengthened. For this reason, it is not easy to secure a space for disposing therein the leveling actuator.

On the other hand, when the output shaft member of the leveling actuator is disposed to protrude upward or downward from the actuator main body and is coupled at its leading end portion to an aiming nut, it is possible to reduce the summed length of the leveling actuator and the aiming screw in the front and rear direction.

However, even when the above configuration is adopted, it may be difficult to secure the space for disposing therein the leveling actuator, depending on a lamp configuration.

The present disclosure has been made in view of the above situations, and an object thereof is to provide a vehicle lamp including a leveling actuator and capable of easily securing a space for disposing therein the leveling actuator, in correspondence to a lamp configuration.

SUMMARY

A vehicle lamp according to an aspect of the present disclosure includes: a lamp body; a lamp unit supported to the lamp body to be aimable in an upper and lower direction and in a right and left direction; and a leveling actuator configured to rotate the lamp unit in the upper and lower direction, independently of rotation by the aiming. And an aiming screw for aiming the lamp unit in the upper and lower direction is supported to the lamp body to be rotatable about an axis extending in a front and rear direction of the vehicle lamp. And an aiming nut to be threadably engaged with the aiming screw is mounted to the aiming screw. And the leveling actuator includes an actuator main body fixed and supported to the lamp unit and an output shaft member supported to the actuator main body to be moveable in the front and rear direction of the vehicle lamp in a state where the output shaft member is positioned to protrude upward or downward from the actuator main body. And a leading end portion of the output shaft member and the aiming nut are coupled at a position distant in the right and left direction from a vertical surface including the axis.

It becomes possible to provide a vehicle lamp including a leveling actuator and capable of easily securing a space for disposing therein the leveling actuator, in correspondence to a lamp configuration.

DETAILED DESCRIPTION

Hereinafter, illustrative embodiments of the present disclosure will be described with reference to the drawings.

Figure 1:
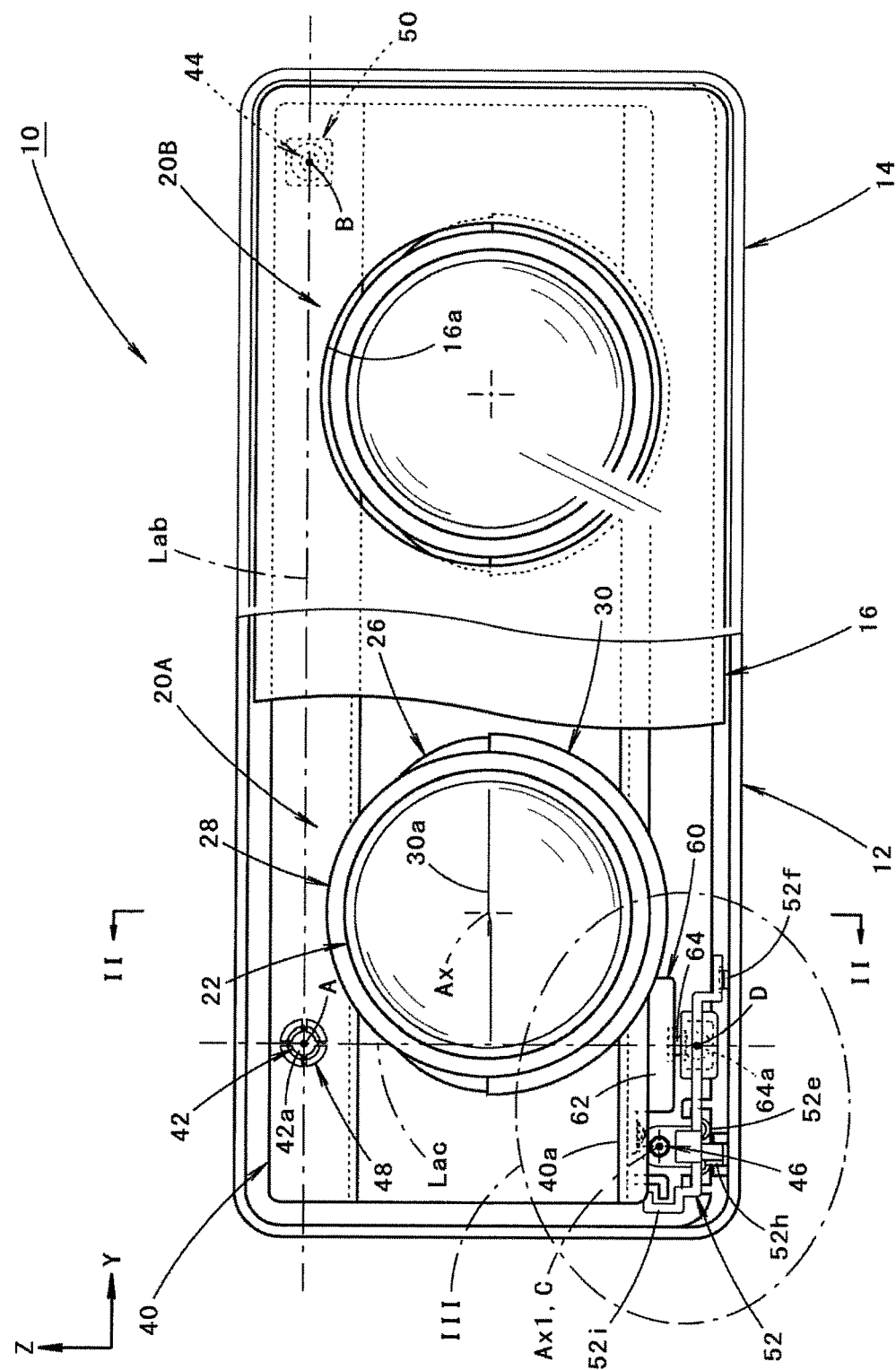
FIG. 1 is a front view depicting a vehicle lamp in accordance with an illustrative embodiment of the present disclosure.
Figure 2:
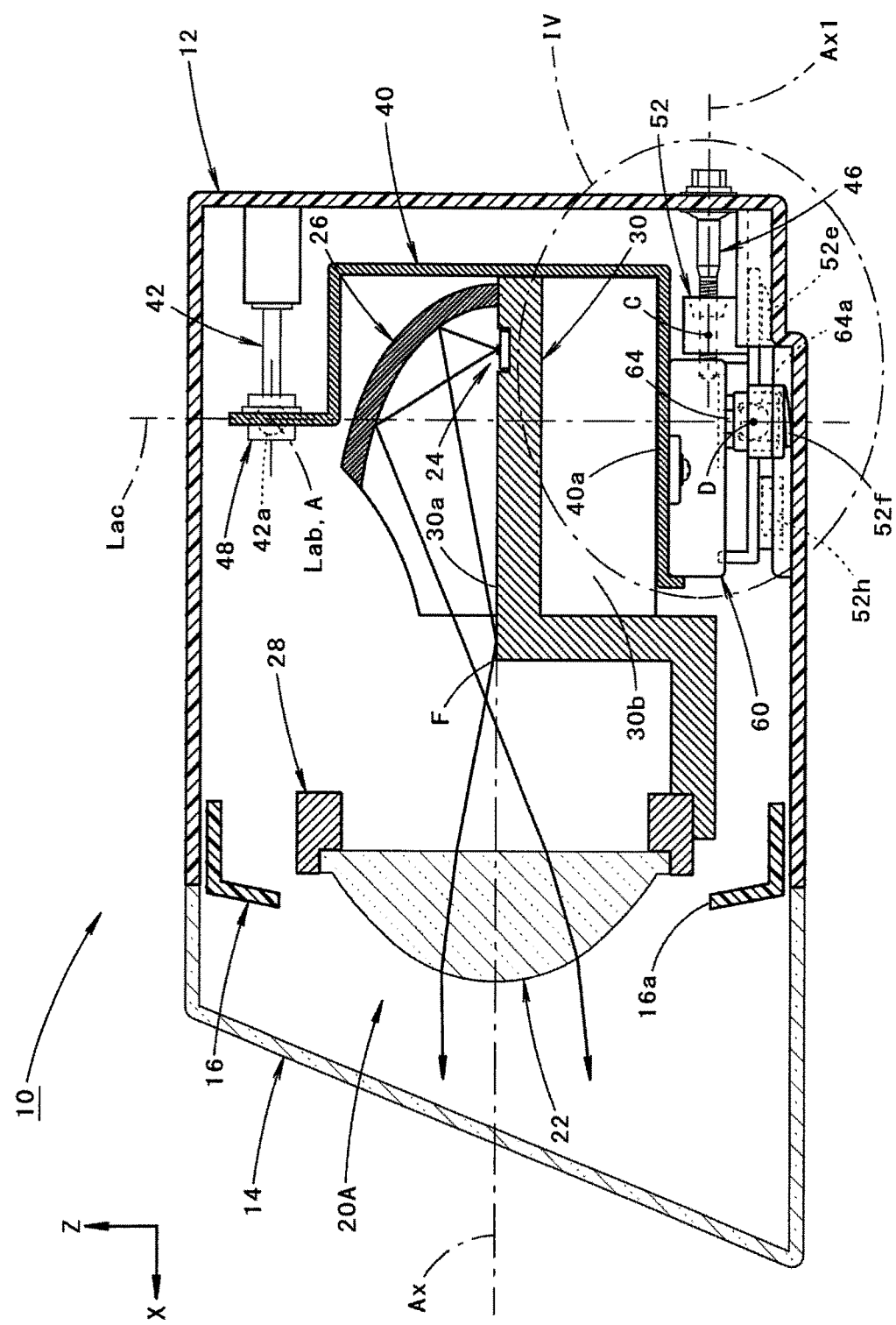
FIG. 2 is a sectional view taken along a line II-II of FIG. 1.

FIG. 1 is a front view depicting a vehicle lamp 10 in accordance with an illustrative embodiment of the present disclosure. FIG. 2 is a sectional view taken along a line II-II of FIG. 1.

In the drawings, a direction denoted with a reference numeral X is a "front" of a lamp ("front" of a vehicle), a direction denoted with a reference numeral Y is a "left direction" (a "left direction" of the vehicle; a "right direction", as seen from the lamp front) perpendicular to the "front", and a direction denoted with a reference numeral Z is an "upper direction".

As shown in FIG. 1, the vehicle lamp 10 of the illustrative embodiment is a headlamp arranged at a right front end portion of a vehicle, and has a configuration where a lamp unit 20A for low beam irradiation and a lamp unit 20B for high beam irradiation are accommodated side by side in a vehicle width direction in a lamp chamber formed by a lamp body 12 and a translucent cover 14 that is transparent and is mounted to a front opening of the lamp body.

In the lamp chamber, an extension panel 16 formed to surround the two lamp units 20A, 20B is disposed in the vicinity of the front of the lamp units. The extension panel 16 is formed with circular openings 16a for enabling light irradiation from the lamp units 20A, 20B at positions corresponding to the respective lamp units 20A, 20B.

The two lamp units 20A, 20B are supported to the lamp body 12 via a common bracket 40.

The bracket 40 is supported to the lamp body 12 to be rotatable in an upper and lower direction and in a right and left direction by a pivot 42 positioned at a right upper side (a left upper side, as seen from the lamp front) and two aiming screws 44, 46 positioned at a left upper side and a right lower side.

Also, a leveling actuator 60 for rotating the two lamp units 20A, 20B in the upper and lower direction together with the bracket 40, independently of rotation by the aiming, is fixed and supported to the bracket 40.

The two lamp units 20A, 20B are all configured as a projector-type lamp unit.

As shown in FIG. 2, the lamp unit 20A for low beam irradiation positioned at the right includes a projection lens 22 having an optical axis Ax extending in the front and rear direction of the vehicle, a light emitting device 24 arranged at the rear of a rear focus F of the projection lens 22, and a reflector 26 disposed to cover the light emitting device 24 from above and configured to reflect light from the light emitting device 24 toward the projection lens 22.

The light emitting device 24 and the reflector 26 are supported to a base member 30, and the projection lens 22 is supported to the base member 30 via a lens holder 28.

The base member 30 is formed with an upward reflection surface 30a configured to reflect upward a part of reflected light from the reflector 24 and to cause the same to be incident on the projection lens 22 so as to form a cutoff line of a light distribution pattern for low beam.

A lower surface of the base member 30 is formed with a plurality of heat radiation fins 30b, so that the base member 30 functions as a heat sink.

The lamp unit 20A is fixed and supported to the bracket 40 at the base member 30.

In the meantime, a part of the configuration of the lamp unit 20B is different from the lamp unit 20A so as to perform high beam irradiation but the other configuration is similar to the lamp unit 20A.

The bracket 40 extends in the vehicle width direction at the rear of the two lamp units 20A, 20B, and a lower end portion thereof is formed with a lower wall part 40a configured to support the two lamp units 20A, 20B and extending toward the lamp front.

The pivot 42 positioned at the right upper side in the lamp chamber is disposed to extend in the front and rear direction of the lamp, and a leading end portion (front end portion) 42a is formed into a spherical shape. The pivot 42 is fixed and supported at its base end portion to the lamp body 12. The pivot 42 is engaged at the leading end portion 42a with a spherical step bearing 48 mounted to the bracket 40 so as to be rotatable in all directions.

The aiming screw 44 (refer to FIG. 1) positioned at the left upper side in the lamp chamber is disposed to extend in the front and rear direction of the lamp, and is rotatably supported at its base end portion (rear end portion) to the lamp body 12. The aiming screw 44 is threadably engaged with an aiming nut 50 mounted to the bracket 40, in the vicinity of the leading end thereof. The aiming nut 50 is mounted to the bracket 40 in an aspect where the bracket 40 can rotate to some extent in the front and rear direction about a threadably engaged position B with the aiming screw 44.

The aiming screw 46 positioned at the right lower side in the lamp chamber is also disposed to extend in the front and rear direction of the lamp, and is rotatably supported at its base end portion (rear end portion) to the lamp body 12. An aiming nut 52 to be threadably engaged with the aiming screw 46 is mounted in the vicinity of a leading end of the aiming screw 46. The aiming nut 52 is supported to the bracket 40 via the leveling actuator 60.

As shown in FIG. 1, an engaging position A of the leading end portion 42a of the pivot 42 and the spherical step bearing 48 is located at the same height as the threadably engaged position B of the aiming screw 44 and the aiming nut 50. However, the engaging position A is displaced toward the lamp rear-side relative to the threadably engaged position B. In the meantime, a threadably engaged position C of the aiming screw 46 and the aiming nut 52 is displaced outward (rightward) in the vehicle width direction with respect to a position located just below the engaging position A.

When aiming the two lamp units 20A, 20B in the upper and lower direction, since a rotation central axis Lab becomes a line connecting the engaging position A and the threadably engaged position B, it becomes a line extending in a direction inclined to the lamp rear-side from the threadably engaged position B toward the engaging position A in a horizontal plane.

On the other hand, when aiming the two lamp units 20A, 20B in the right and left direction, a rotation central axis Lac is a line extending in the vertical direction connecting the engaging position A and a coupling position D (which will be described later) located just below the engaging position A.

Figure 3:
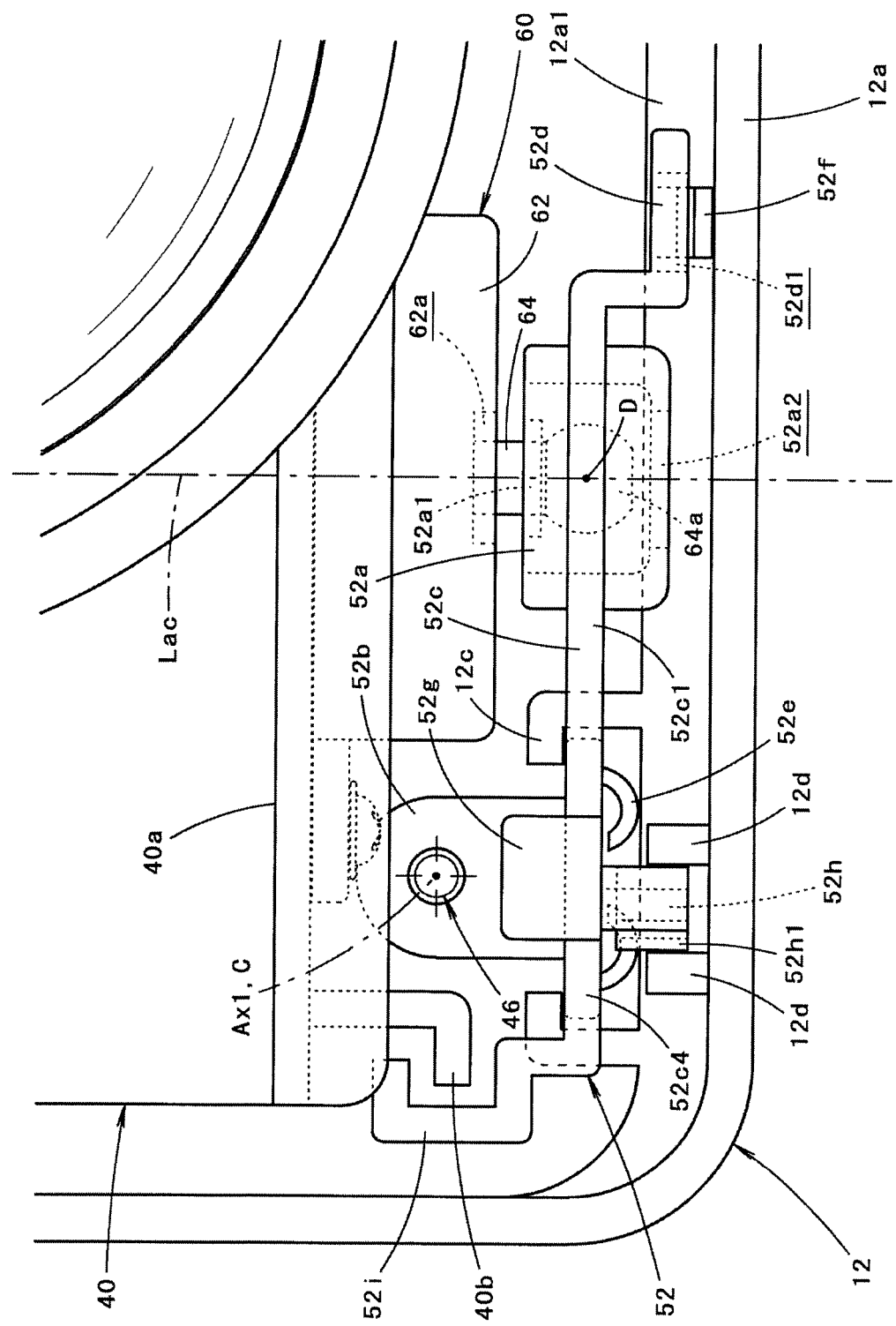
FIG. 3 is a detailed view of a III part of FIG. 1.
Figure 4:
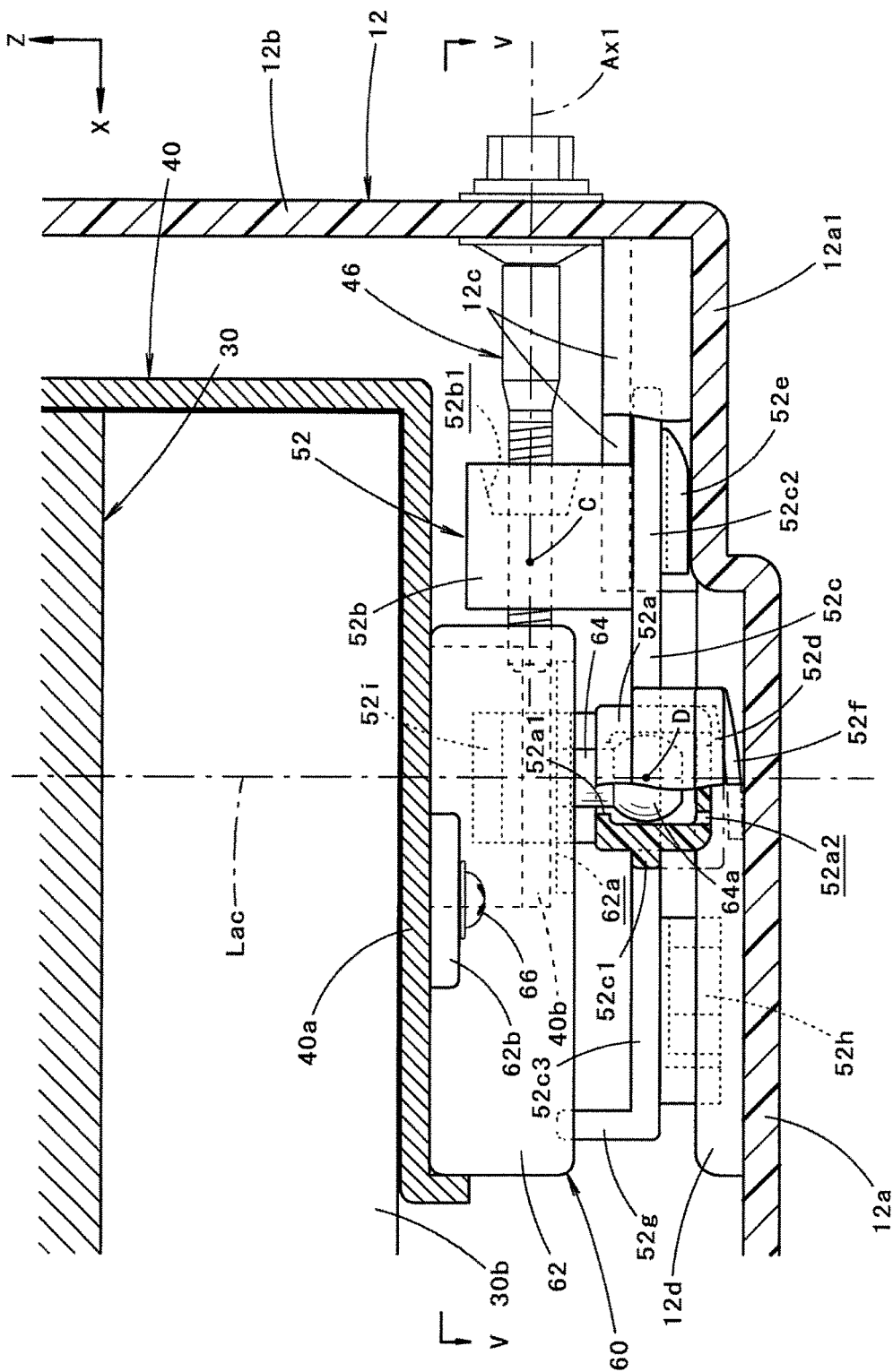
FIG. 4 is a detailed view of a IV part of FIG. 2.
Figure 5:
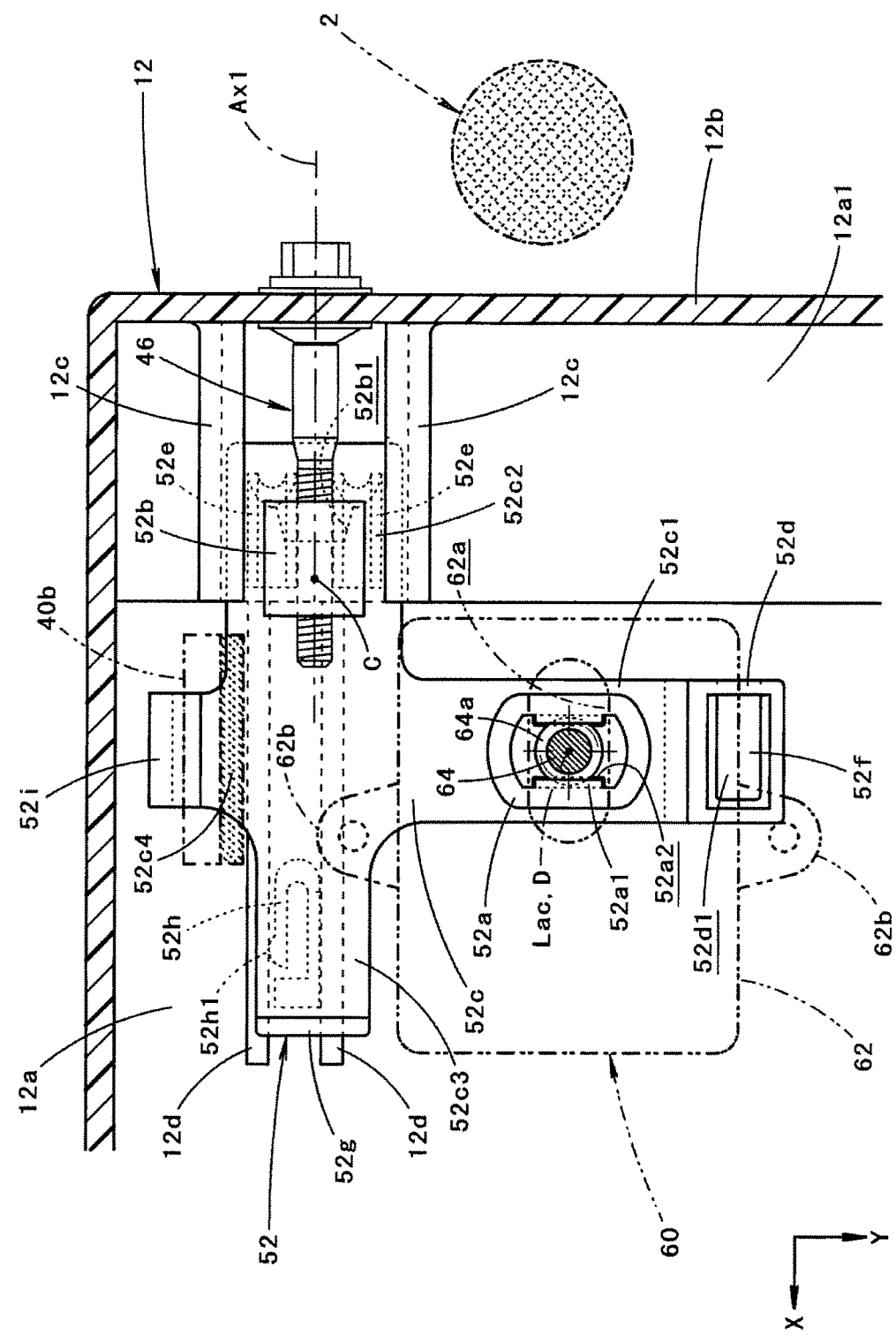
FIG. 5 is a sectional view taken along a line V-V of FIG. 4.
Figure 6:
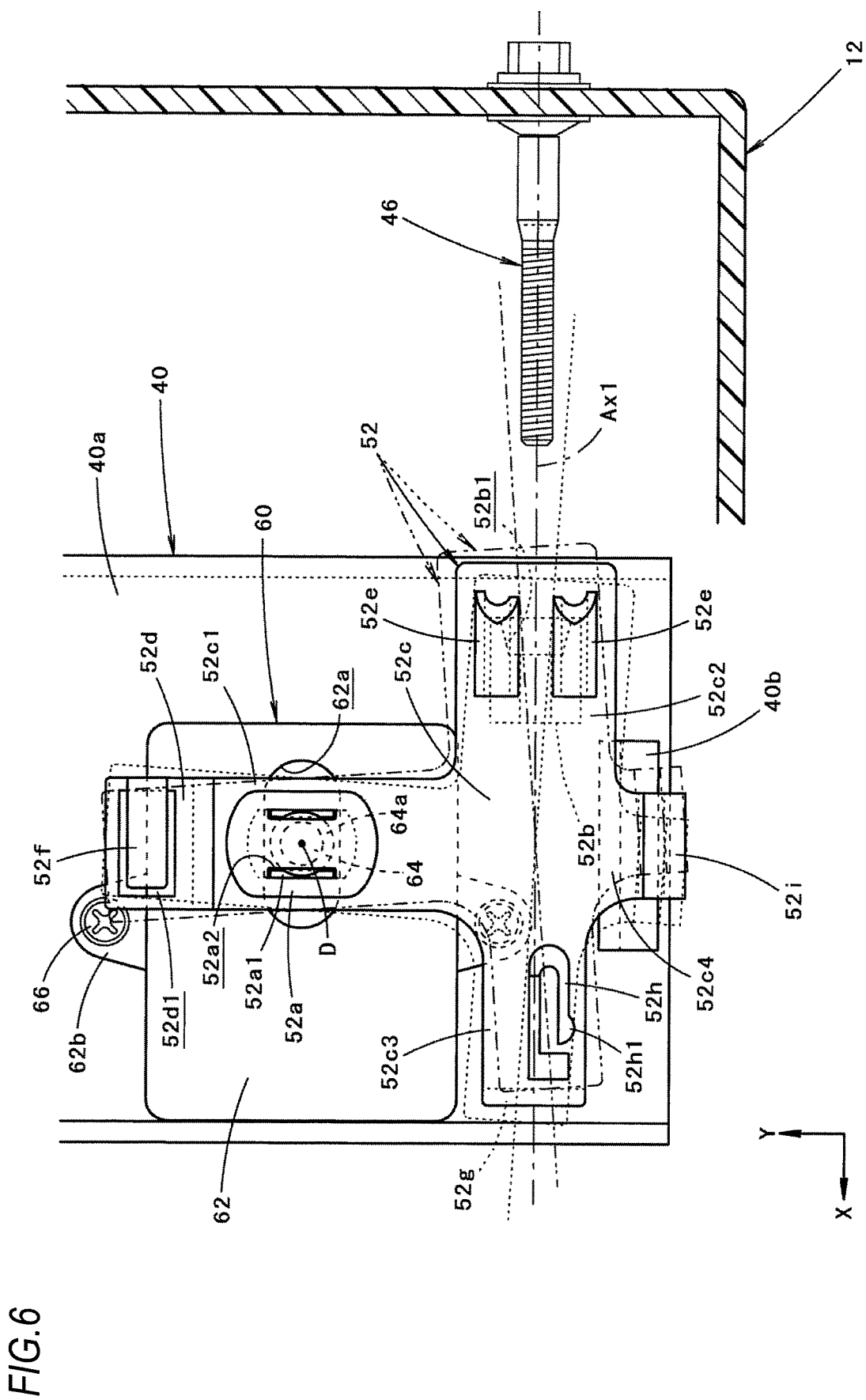
FIG. 6 is a bottom view depicting an aiming nut of the vehicle lamp, together with a leveling actuator and a bracket.
Figure 7:
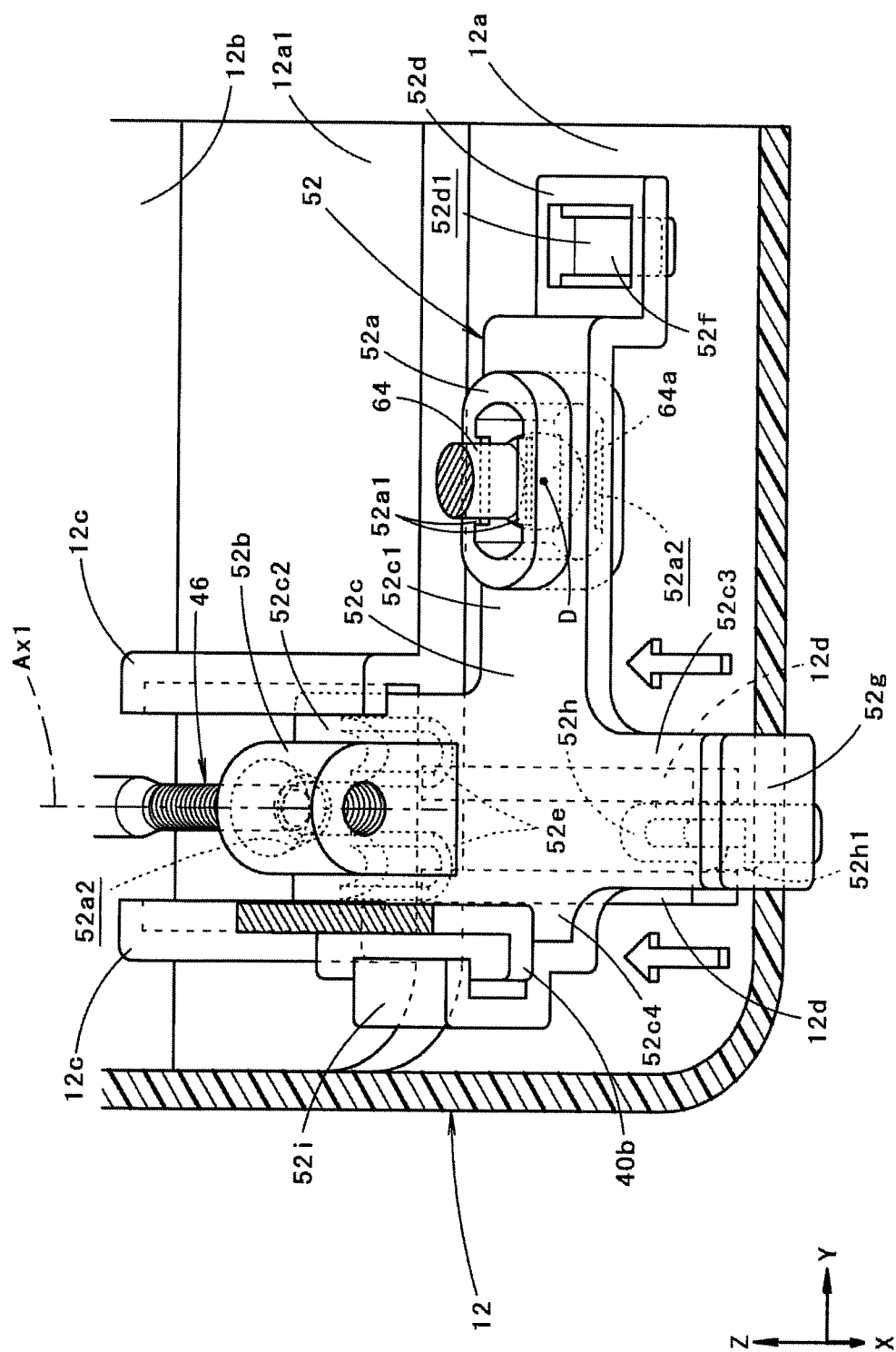
FIG. 7 is a perspective view depicting main parts of the vehicle lamp, as seen from an oblique upper front part.

FIG. 3 is a detailed view of a III part of FIG. 2, and FIG. 4 is a detailed view of a IV part of FIG. 2. FIG. 5 is a sectional view taken along a line V-V of FIG. 4, and FIG. 6 is a bottom view depicting the aiming nut 52, together with the leveling actuator 60 and the bracket 40. FIG. 7 is a perspective view depicting main parts of the vehicle lamp 10, as seen from an oblique upper front part.

As shown in the drawings, the leveling actuator 60 includes an actuator main body 62 fixed and supported to the lower wall part 40a of the bracket 40 and an output shaft member 64 supported to the actuator main body 62 to be moveable in the front and rear direction of the lamp.

A lower wall part of the actuator main body 62 is formed with a long hole 62a extending in the front and rear direction of the lamp. The output shaft member 64 is disposed to protrude downward (specifically, just below) from the long hole 62a of the actuator main body 62. Also, both left and right side surfaces of the actuator main body 62 are formed with tabs 62b having holes at upper end portions thereof. The leveling actuator 60 is fixed to the lower wall part 40a of the bracket 40 by fastening screws 66 into the respective tabs 62b.

A leading end portion 64a of the output shaft member 64 has a spherical shape of which a diameter is larger than a shaft part of the output shaft member. A tip portion of the leading end portion 64a has a planar shape. The output shaft member 64 is coupled at the leading end portion 64a to the aiming nut 52.

The leading end portion 64a of the output shaft member 64 and the aiming nut 52 are coupled at a position distant in the right and left direction from a vertical surface including an axis Ax1 extending in the front and rear direction of the lamp and becoming a rotation center of the aiming screw 46. Specifically, the coupling position D of the leading end portion 64a of the output shaft member 64 and the aiming nut 52 is displaced inward (leftward) in the vehicle width direction with respect to the threadably engaged position C. Also, the coupling position D is displaced toward the lamp front-side with respect to the threadably engaged position C.

The aiming nut 52 is an injection-molded product made of resin, and is supported to the lamp body 12 to be slidable in the front and rear direction of the lamp.

The aiming nut 52 is formed at a part of the coupling position D with a concave part 52a for fitting therein the leading end portion 64a of the output shaft member 64. Also, the aiming nut 52 is formed at a part of the threadably engaged position C with a screw engaging part 52b to be threadably engaged with the aiming screw 46. The concave part 52a and the screw engaging part 52b are integrated via a plate-shaped main body part 52c extending along the horizontal plane.

The concave part 52a has a cylindrical shape extending in the upper and lower direction, and is connected to the plate-shaped main body part 52c at a central portion of an outer peripheral surface in the upper and lower direction. The concave part 52a has an inner peripheral shape with which the leading end portion 64a of the output shaft member 64 fitted in the concave part 52a can be relatively displaced in the upper and lower direction and in the right and left direction by predetermined amounts, respectively.

Specifically, the concave part 52a has a pair of front and rear vertical surfaces formed into a planar shape having a width in the front and rear direction slightly larger than the diameter of the leading end portion 64a of the output shaft member 64, a pair of left and right vertical surfaces formed as a part of a cylindrical surface larger to some extent than the diameter of the leading end portion 64a of the output shaft member 64, and a bottom wall surface formed at a position slightly deeper than a vertical width of the leading end portion 64a of the output shaft member 64.

Thereby, the output shaft member 64 of which the leading end portion 64a is fitted in the concave part 52a correctly transmits movement thereof in the front and rear direction of the lamp to the aiming nut 52, and allows a slight play in the upper and lower direction and a relatively large play in the right and left direction.

Upper end portions of the pair of front and rear vertical surfaces of the concave part 52a are formed with protrusions 52a1 for preventing the leading end portion 64a of the output shaft member 64 fitted in the concave part 52a from separating from the concave part 52a so as to extend over a predetermined length in the right and left direction. Also, slits 52a2 larger than the protrusions 52a1 are formed at portions just below the protrusions 52a formed at the bottom wall part of the concave part 52a.

In the meantime, the screw engaging part 52b is formed into a semi-cylindrical shape extending in the front and rear direction of the lamp, and is connected at a lower end portion thereof to the plate-shaped main body part 52c.

A rear end portion of the screw engaging part 52b is formed with a funnel-shaped opening 52b1 for easy threadable engaging with the aiming screw 46.

As shown in FIGS. 5 and 6, the plate-shaped main body part 52c has a substantial cross shape extending in the front and rear direction of the lamp and in the right and left direction, as seen from above. The concave part 52a is disposed at a leftward extension portion 52c1 of the plate-shaped main body part 52c, and the screw engaging part 52b is disposed at a rearward extension portion 52c2 thereof.

The rearward extension portion 52c2 has a width in the right and left direction larger to some extent than the screw engaging part 52b. The aiming nut 52 is supported to the lamp body 12 to be slidable in the front and rear direction of the lamp at the rearward extension portion 52c2.

A lower surface of the rearward extension portion 52c2 is formed with a pair of left and right elastic pieces 52e having a substantially semi-cylindrical section and extending in the front and rear direction of the lamp. The pair of left and right elastic pieces 52e is formed so that inner parts facing each other are distant from the lower surface of the rearward extension portion 52c2. Thereby, the pair of left and right elastic pieces 52e is elastically deformed by a pressing force in the upper and lower direction. A front end face of each elastic piece 52e extends along the vertical surface. However, a rear end face thereof extends with being inclined relative to the vertical surface toward the lamp front-side.

In the meantime, the leftward extension portion 52c1 has a width in the front and rear direction slightly larger than the concave part 52a, and a leading end portion thereof (i.e., a more leftward position than the concave part 52a) is formed with a step-down part 52d extending in the horizontal direction at a position lower than the leftward extension portion 52c1.

The step-down part 52d is formed with a rectangular opening 52d1 extending in the front and rear direction of the lamp. In the opening 52d1, a rectangular elastic piece 52f extending in the front and rear direction of the lamp is disposed. The elastic piece 52f has a cantilever shape extending slightly downward from a rear end edge position of the opening 52d1 of the step-down part 52d toward the lamp front.

A forward extension portion 52c3 of the plate-shaped main body part 52c has a width in the right and left direction smaller than the rearward extension portion 52c2, and a front end portion thereof is formed with a flange portion 52g extending upward along a front end edge of the forward extension portion 52c3.

A part of a lower surface of the forward extension portion 52c3, which is located at a more rightward side than the axis Ax1 of the aiming screw 46, is formed with an elastic piece 52h for elastically pressing the aiming nut 52 to the lamp body 12 in the right and left direction.

The elastic piece 52h extends with being folded back into a J-shape from a rear end position of a vertical wall part extending in the front and rear direction of the lamp at a position substantially just below the axis Ax1 toward the lamp front, and a right surface of a front end portion thereof is formed with a semi-circular cylinder-shaped protrusion 52h1 extending in the upper and lower direction.

A rightward extension portion 52c4 of the plate-shaped main body part 52c has a width in the front and rear direction smaller than the leftward extension portion 52c1, and a leading end portion thereof (i.e., a more rightward position than the axis Ax1) is formed with a stopper 52i for preventing the aiming nut 52 from rotating about the coupling position D by a predetermined angle or greater.

As shown in FIG. 3, the bracket 40 is formed with a nut engaging piece 40b extending downward from a right end portion of the lower wall part 40a thereof. The nut engaging piece 40b has an L-shaped section extending in the front and rear direction of the lamp over a predetermined length. The nut engaging piece 40b extends downward from the lower wall part 40a and is then bent rightward at right angle at the leading end portion.

The stopper 52i is formed to surround the leading end portion of the nut engaging piece 40b from the lower, right and upper sides. The stopper 52i is formed to have a length in the front and rear direction shorter than the nut engaging piece 40*b* with a predetermined interval from the leading end portion of the nut engaging piece 40*b*.

As shown with the dashed-two dotted line and dotted line in FIG. 6, when the aiming nut 52 is rotated in the right and left direction from an original position (i.e., a position at which a central axis of the screw engaging part 52*b* coincides with the axis Ax1) about the coupling position D by a predetermined angle, a front end edge or rear end edge of a side wall of the stopper 52*i* is contacted to the leading end portion of the nut engaging piece 40*b*, so that the further rotation thereof is restrained.

Also, when the aiming nut 52 is rotated in the upper and lower direction from the original position about the coupling position D by a predetermined angle, an upper surface wall or lower surface wall of the stopper 52*i* is contacted to the leading end portion of the nut engaging piece 40*b*, so that the further rotation thereof is restrained.

As shown in FIG. 4, a part, which is close to a rear surface wall 12*b*, of a lower surface wall 12*a* of the lamp body 12 is formed as a step-up part 12*a*1 higher than the other general part.

An upper surface of the step-up part 12*a*1 is formed with a pair of left and right slide engaging parts 12*c* for supporting the aiming nut 52 to be slidable in the front and rear direction of the lamp so as to extend in parallel with each other from the rear surface wall 12*b* toward the lamp front.

Also, the general part of the lower surface wall 12*a* of the lamp body 12 is formed with a pair of beads 12*d* linearly extending toward the lamp front. The pair of beads 12*d* is formed at a slightly more leftward position than the slide engaging part 12*c* positioned at the right and a position distant from the corresponding position by substantially the same size as the overall width of the elastic piece 52*h* in the right and left direction.

As shown in FIG. 7, the aiming nut 52 is mounted to the lamp body 12 from the lamp front-side toward a direction shown with the arrow in FIG. 7 in a state where the leading end portion 64*a* of the output shaft member 64 is fitted in the concave part 52*a*.

That is, after the rearward extension portion 52*c*2 of the plate-shaped main body part 52*c* of the aiming nut 52 is inserted between the pair of left and right slide engaging parts 12*c*, the screw engaging part 52*b* of the aiming nut 52 is inserted into the leading end portion of the aiming screw 46 to threadably engage with the aiming screw 46 and is moved to the lamp rear-side, so that the aiming nut is mounted to the lamp body 12.

At this time, when the flange portion 52*d*3 of the aiming nut 52 is pushed from the lamp front-side by a finger, the aiming nut 52 can be easily moved toward the lamp rear-side along the upper surface of the lower surface wall 12*a* of the lamp body 12. Also, at this time, the pair of left and right elastic pieces 52*f* is contacted to the step-up part 12*a*1 of the lower surface wall 12*a* and is thus elastically deformed, so that the rearward extension portion 52*c*2 can be easily engaged with the pair of left and right slide engaging parts 12*c*. Also, at this time, the elastic pieces 52*f* are contacted to the general part of the lower surface wall 12*a* and are thus elastically deformed and the elastic piece 52*h* is inserted between the pair of beads 12*d* to elastically deform the leading end portion 52*h*1 and to bring the same contact with the right bead 12*d*, so that a posture of the aiming nut 52 is stably kept.

Also, the aiming nut 52 is configured so that it can be rotated from the original position about the coupling position D before it is mounted to the lamp body 12. However, the stopper 52*i* is contacted to the nut engaging piece 40*b* of the bracket 40, so that the rotation of the aiming nut 52 is restrained from rotating by a predetermined angle or greater. Also, since the rear end portion of the screw engaging part 52*b* is formed with the funnel-shaped opening 52*b*1, the threadable engaging with the aiming screw 46 can be easily performed upon the mounting to the lamp body 12.

Figure 8:
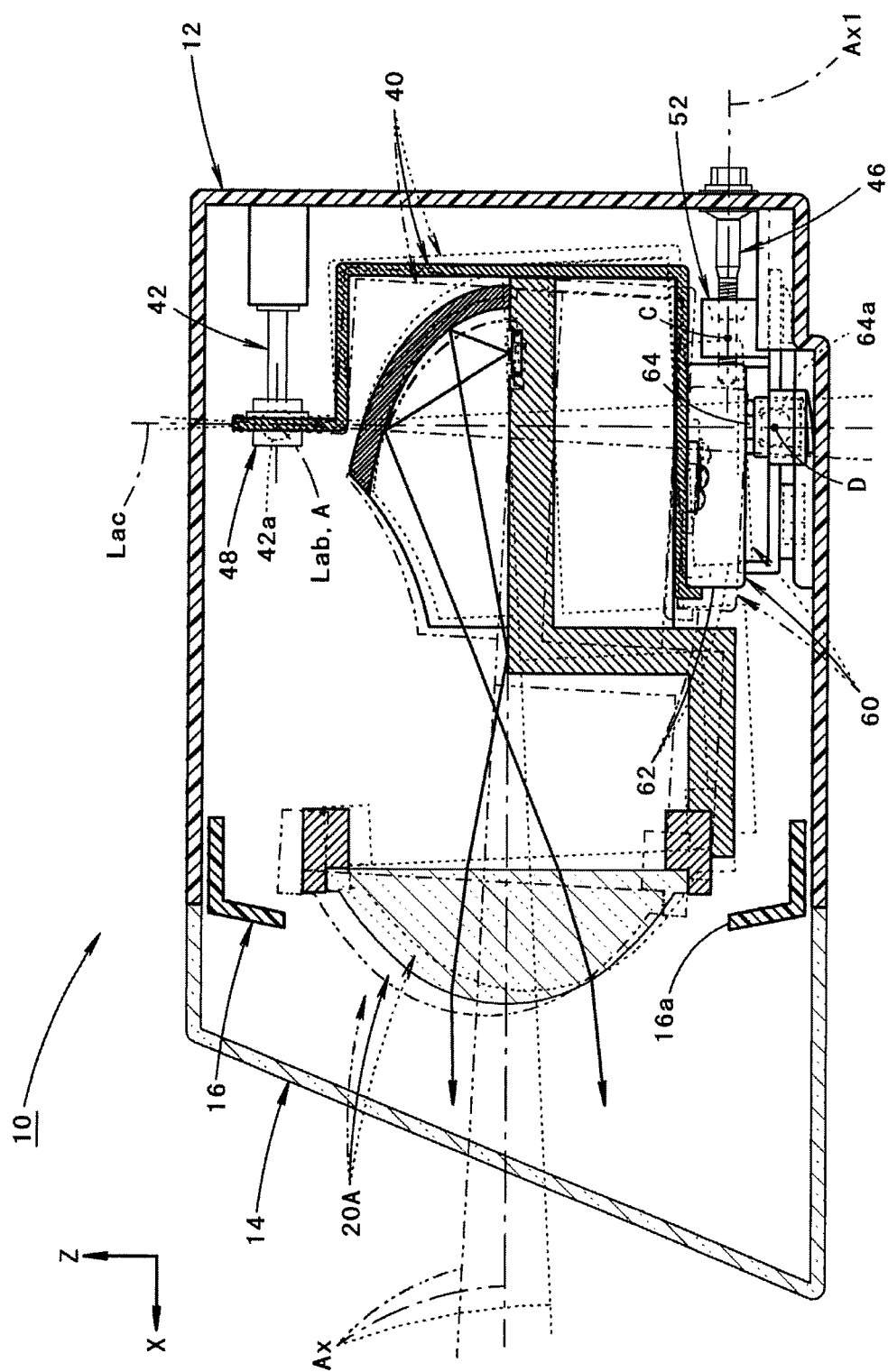
FIG. 8 is a view similar to FIG. 2 for illustrating a leveling function of the vehicle lamp.

FIG. 8 is a view similar to FIG. 2 for illustrating a leveling function of the vehicle lamp 10 of the illustrative embodiment.

FIG. 8 depicts an aspect where the lamp unit 20A is subjected to leveling together with the bracket 40 in both the upper and lower directions from an aiming reference position in the upper and lower direction by driving of the leveling actuator 60.

As shown with the solid line in FIG. 8, in a state where the lamp unit 20A is located at the aiming reference position in the upper and lower direction and is not subjected to the leveling, the optical axis Ax extends horizontally in the front and rear direction of the lamp.

As shown with the dashed-two dotted line in FIG. 8, when leveling upward the lamp unit 20A, the output shaft member 64 of the leveling actuator 60 moves relative to the actuator main body 62 toward the lamp rear-side. At this time, since the leading end portion 64*a* of the output shaft member 64 is coupled to the aiming nut 52, which is located at the aiming reference position in the upper and lower direction, at the coupling position D, the actuator main body 62 is actually moved toward the lamp front-side. Thereby, the lamp unit 20A is rotated upward about the rotation central axis Lab, together with the bracket 40, and the optical axis Ax extends obliquely upwards.

On the other hand, as shown with the dotted line in FIG. 8, when leveling downward the lamp unit 20A, the output shaft member 64 of the leveling actuator 60 moves relative to the actuator main body 62 toward the lamp front-side. However, actually, the actuator main body 62 moves toward the lamp rear-side. Thereby, the lamp unit 20A is rotated downward about the rotation central axis Lab, together with the bracket 40, and the optical axis Ax extends obliquely downwards.

Subsequently, operational effects of the illustrative embodiment are described.

The vehicle lamp 10 of the illustrative embodiment includes the leveling actuator 60 for rotating the lamp unit 20A in the upper and lower direction, independently of the rotation by the aiming. Since the output shaft member 64 of the leveling actuator 60 is coupled at the leading end portion 64*a* to the aiming nut 52 that is threadably engaged with the aiming screw 46 for aiming the lamp unit 20A in the upper and lower direction, it is possible to perform the leveling by moving the output shaft member 64 relative to the actuator main body 62 in the front and rear direction of the lamp.

At this time, the output shaft member 64 of the leveling actuator 60 is disposed to protrude downward from the actuator main body 62 fixed and supported to the lamp unit 20A and is not disposed in series with the aiming screw 46, unlike the related art. Therefore, it is possible to reduce a summed length of the leveling actuator 60 and the aiming screw 46 in the front and rear direction, so that it is possible to easily secure a space for disposing therein the leveling actuator 60.

According to the illustrative embodiment, the leading end portion 64*a* of the output shaft member 64 and the aiming nut 52 are coupled at the position distant in the right and left direction from the vertical surface including the axis Ax1 upon rotation of the aiming screw 46, following operational effects can be achieved.

That is, since the coupling position D of the output shaft member 64 and the aiming nut 52 is offset in the right and left direction relative to the threadably engaged position C of the aiming screw 46 and the aiming nut 52, it is possible to increase a degree of arrangement freedom of the leveling actuator 60. Thereby, it is possible to easily secure a space for disposing therein the leveling actuator 60, in correspondence to the lamp configuration.

Therefore, as shown in FIG. 5, since a vehicle body-side member 2 (for example, a piping for washer tank, and the like) is arranged in the vicinity of the rear of the lamp body 12, even when it is necessary to dispose the aiming screw 46 with avoiding the vehicle body-side member, it is possible to couple the output shaft member 64 and the aiming nut 52 in a state where the leveling actuator 60 is disposed with ease.

Like this, according to the illustrative embodiment, it is possible to easily secure the space for disposing therein the leveling actuator 60 in the vehicle lamp 10 including the leveling actuator 60, in correspondence to the lamp configuration.

Also, according to the illustrative embodiment, the coupling position D of the output shaft member 64 and the aiming nut 52 is offset in the right and left direction relative to the threadably engaged position C of the aiming screw 46 and the aiming nut 52, so that it is possible to easily reduce a summed width of the leveling actuator 60 and the aiming nut 52 in the upper and lower direction.

Also, in the illustrative embodiment, the aiming nut 52 is supported to the lamp body 12 to be slidable in the front and rear direction of the lamp. Therefore, it is possible to prevent in advance a situation where when the aiming screw 46 is rotated so as to aim the lamp unit 20A in the upper and lower direction, the aiming nut 52 also intends to rotate and an excessive force is thus applied to the coupled part with the output shaft member 64 of the leveling actuator 60.

At this time, the aiming nut 52 is provided with the elastic pieces 52e, 52f for elastically pressing the aiming nut 52 to the lamp body 12 in the upper and lower direction at both left and right sides of the coupling position D with the output shaft member 64. Thereby, even though the coupling position D of the output shaft member 64 and the aiming nut 52 is offset in the right and left direction relative to the threadably engaged position C of the aiming screw 46 and the aiming nut 52, after the engaging state between the aiming nut 52 and the lamp body 12 is securely kept, the aiming nut 52 can be caused to slide relative to the lamp body 12.

Also, in the illustrative embodiment, the aiming nut 52 is provided with the elastic piece 52h for elastically pressing the aiming nut 52 to the lamp body 12 in the right and left direction at a part positioned at an opposite side to the coupling position D with the output shaft member 64 with respect to the vertical surface including the axis Ax1. Thereby, following operational effects can be achieved.

That is, when the coupling position D of the output shaft member 64 and the aiming nut 52 is offset in the right and left direction relative to the threadably engaged position C of the aiming screw 46 and the aiming nut 52, an external force of displacing the aiming nut 52 in the right and left direction is applied as a result of the leveling and aiming. However, since the aiming nut 52 is elastically pressed in the right and left direction by the elastic piece 52h, the displacement of the aiming nut 52 can be restrained. Thereby, after the engaging state between the aiming nut 52 and the lamp body 12 is securely kept, the leveling and aiming can be performed.

Also, in the illustrative embodiment, the aiming nut 52 is provided with the stopper 52i for preventing the aiming nut 52 from rotating about the coupling position D by a predetermined angle or greater through contact with the bracket 40 configured to support the lamp unit 12A, at a part positioned at an opposite side to the coupling position D with the output shaft member 64 with respect to the vertical surface including the axis As1. Thereby, following operational effects can be achieved in a lamp manufacturing process.

That is, when mounting the bracket 40 to the lamp body 12 after mounting the leveling actuator 60 to the bracket 40 and coupling the aiming nut 52 to the output shaft member 64 of the leveling actuator, it is possible to enable a posture of the aiming nut 52 to enter a predetermined inclination angle range by the rotation restraining operation of the stopper 52i for the aiming nut 52. Therefore, it is possible to easily threadably engage the aiming nut 52 with the aiming screw 46 supported to the lamp body 12.

Also, in the illustrative embodiment, the aiming nut 52 is formed with the concave part 52a for fitting therein the leading end portion 64a of the output shaft member 64 of the leveling actuator 60. The concave part 52a has the inner peripheral surface shape with which the leading end portion 64a of the output shaft member 64 fitted in the concave part 52a can be relatively displaced in the upper and lower direction by the predetermined amount. Therefore, after preventing the excessive force from being applied to the coupled part of the output shaft member 64 of the leveling actuator 60 and the aiming nut 52, the movement of the output shaft member 64 in the front and rear direction of the lamp can be transmitted as the rotation of the lamp unit 20A in the upper and lower direction. Thereby, it is possible to smoothly perform the leveling and the aiming in the upper and lower direction and to absorb a mounting error of each member.

Also, the concave part 52a of the aiming nut 52 has the inner peripheral surface shape with which the leading end portion 64a of the output shaft member 64 fitted in the concave part 52a can be relatively displaced in the right and left direction by the predetermined amount. Therefore, even when the rotation central axis Lab of the lamp unit 20A upon the leveling and the aiming in the upper and lower direction extends in a direction inclined relative to the vehicle width direction in the front and rear direction, it is possible to prevent the excessive force from being applied to the coupled part of the output shaft member 64 of the leveling actuator 60 and the aiming nut 52 and to absorb the mounting error of each member.

In the illustrative embodiment, the coupling position D of the leading end portion 64a of the output shaft member 64 and the aiming nut 52 is set at the position distant inward (leftward) in the vehicle width direction from the vertical surface including the axis Ax1. However, a configuration where the coupling position is set at a position distant outward (rightward) in the vehicle width direction can also be adopted.

In the illustrative embodiment, the elastic pieces 52e, 52f are formed integrally with the aiming nut 52. However, a configuration where a metallic elastic member is mounted to the aiming nut 52, as a separate member, can also be adopted, for example.

In the illustrative embodiment, the two lamp units 20A, 20B are all the projector-type lamp units. However, a parabola type lamp unit can also be adopted.

In the illustrative embodiment, the two lamp units 20A, 20B are supported to the lamp body 12 via the bracket 40.

However, one or three or more lamp units may be supported to the lamp body 12 via the bracket 40. Also, the lamp unit may be directly supported to the lamp body 12 without via the bracket 40.

In the below, modified embodiments of the illustrative embodiment are described.

A first modified embodiment of the illustrative embodiment is first described.

Figure 9:
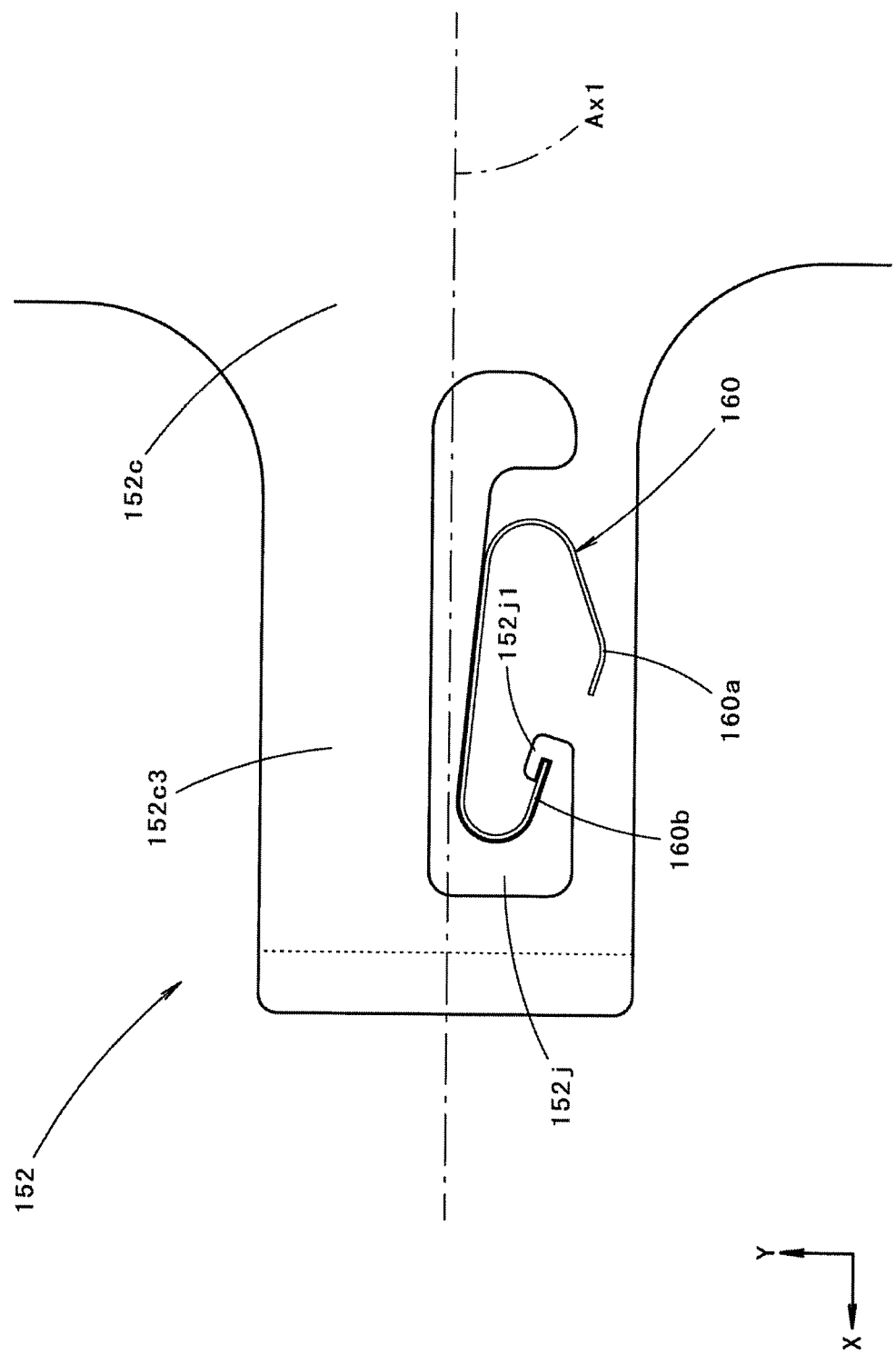
FIG. 9 is a bottom view depicting main parts of an aiming nut in accordance with a first modified embodiment of the illustrative embodiment.

FIG. 9 is a bottom view depicting main parts of an aiming nut 152 in accordance with the first modified embodiment.

As shown in FIG. 9, the basic configuration of the aiming nut 152 is similar to the illustrative embodiment. However, a configuration of a forward extension portion 152c3 of a plate-shaped main body part 152c is different from the illustrative embodiment.

That is, in the case of the aiming nut 52 of the illustrative embodiment, the lower surface of the forward extension portion 52c3 of the plate-shaped main body part 52c is formed with the elastic piece 52h. However, in the case of the aiming nut 152 of the first modified embodiment, a lower surface of the forward extension portion 152c3 of the plate-shaped main body part 152c is formed with an elastic piece support portion 152j, and a metallic elastic piece 160 is mounted to the elastic piece support portion 152j.

The elastic piece 160 is formed by forming a plate spring into a substantial C-shape in a horizontal plane. The elastic piece 160 has a base end portion 160b engaged and fixed to an engaging portion 152j1 of the elastic piece support portion 152j and a leading end portion 160a protruding rightward from the elastic piece support portion 152j.

Also in the first modified embodiment, when mounting the aiming nut 152 to the lamp body 12, the leading end portion 160a of the elastic piece 160 is brought into contact with the bead 12d of the lower surface wall 12a, so that a posture of the aiming nut 152 can be stably kept.

Also in the first modified embodiment, it is possible to achieve the operational effects similar to the illustrative embodiment.

Also, by adopting the configuration of the first modified embodiment, it is possible to sufficiently secure the elastic repulsive force of the elastic piece 160.

Subsequently, a second modified embodiment of the illustrative embodiment is described.

Figure 10:
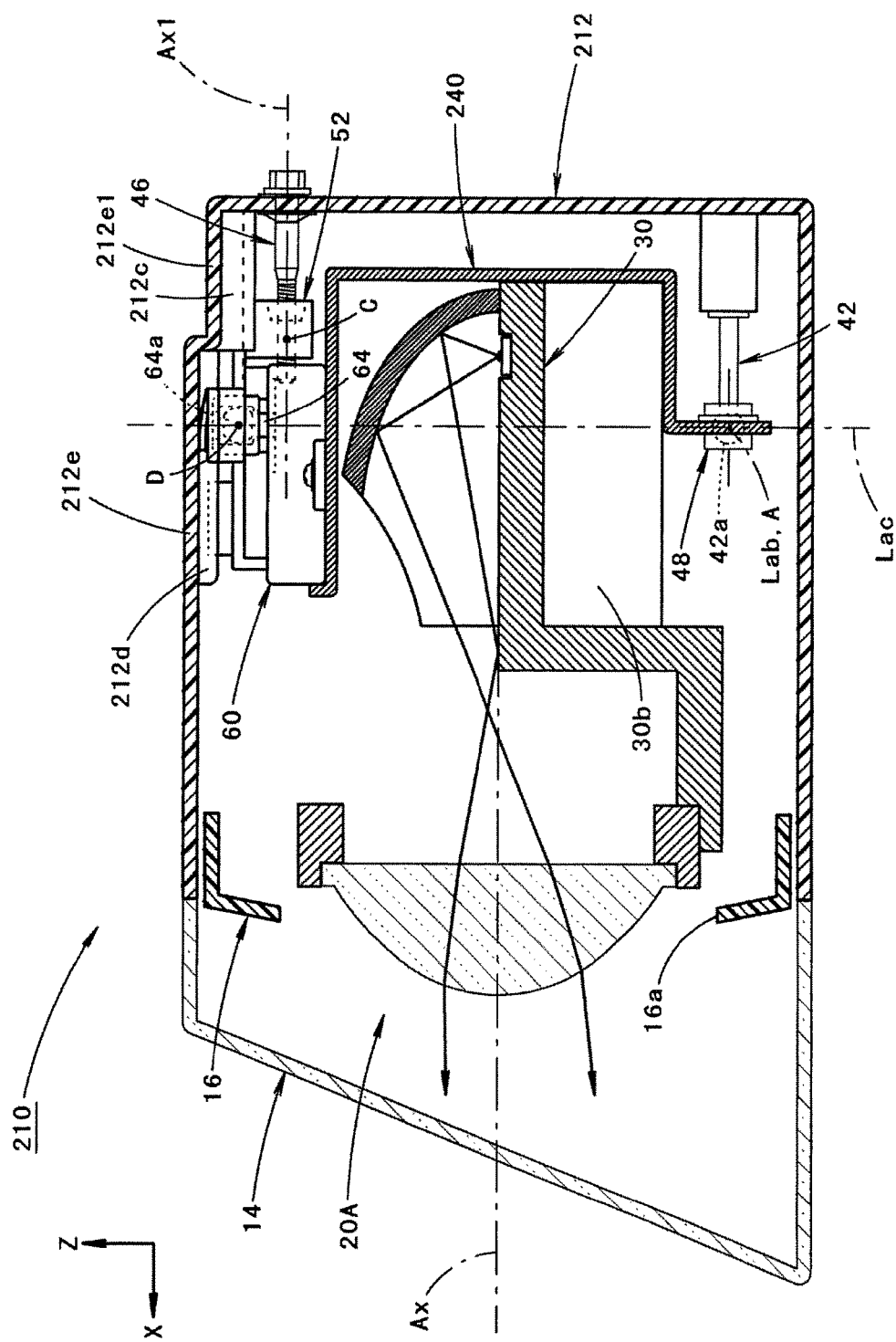
FIG. 10 is a view similar to FIG. 2, depicting a second modified embodiment of the illustrative embodiment.

FIG. 10 is a view similar to FIG. 2, depicting a vehicle lamp 210 of the second modified embodiment.

As shown in FIG. 10, the basic configuration of the vehicle lamp 210 is similar to the illustrative embodiment. However, in the second modified embodiment, a mechanism for aiming and leveling the lamp unit 20A together with a bracket 240 is disposed with being vertically inverted to the illustrative embodiment, and a configuration of a lamp body 212 is also different from the illustrative embodiment.

That is, in the second modified embodiment, the bracket 240 configured to support the lamp unit 20A has a vertically inverted shape to the bracket 40 of the illustrative embodiment, and when aiming the lamp unit 20A in the upper and lower direction, the rotation central axis Lab is located below the lamp unit 20A.

Also in the second modified embodiment, when aiming the lamp unit 20A in the right and left direction, the rotation central axis Lac is a line extending vertically. However, a positional relation between the engaging position A and the coupling position D is opposite to the illustrative embodiment.

Accompanied by this, in the second modified embodiment, the pivot 42 and the spherical step bearing 48 are located below the lamp unit 20A, and the aiming screw 46, the aiming nut 50 and the leveling actuator 60 are located above the lamp unit 20A.

In the second modified embodiment, the output shaft member 64 of the leveling actuator 60 is coupled to the aiming nut 52 with being disposed to protrude upward (specifically, just above) from the actuator main body 62.

In the second modified embodiment, a part, which is close to a rear surface wall 212b, of an upper surface wall 212e of the lamp body 212 is formed as a step-down part 212e1, a lower surface of the step-down part 212a1 is formed with a pair of left and right slide engaging parts 212c, and a general part of the upper surface wall 212e of the lamp body 212 is formed with a pair of beads 212d.

Also in the third modified embodiment, the output shaft member 64 of the leveling actuator 60 is disposed to protrude upward from the actuator main body 62 fixed and supported to the lamp unit 20A and is not dispose in series with the aiming screw 46, unlike the related art. Therefore, it is possible to reduce a summed length of the leveling actuator 60 and the aiming screw 46 in the front and rear direction, so that it is possible to easily secure the space for disposing therein the leveling actuator 60.

Also in the second modified embodiment, since the coupling position D of the output shaft member 64 and the aiming nut 52 is offset in the right and left direction relative to the threadably engaged position C of the aiming screw 46 and the aiming nut 52, it is possible to increase the degree of arrangement freedom of the leveling actuator 60. Thereby, it is possible to easily secure the space for disposing therein the leveling actuator 60, in correspondence to the lamp configuration.

Subsequently, a third modified embodiment of the illustrative embodiment is described.

Figure 11:
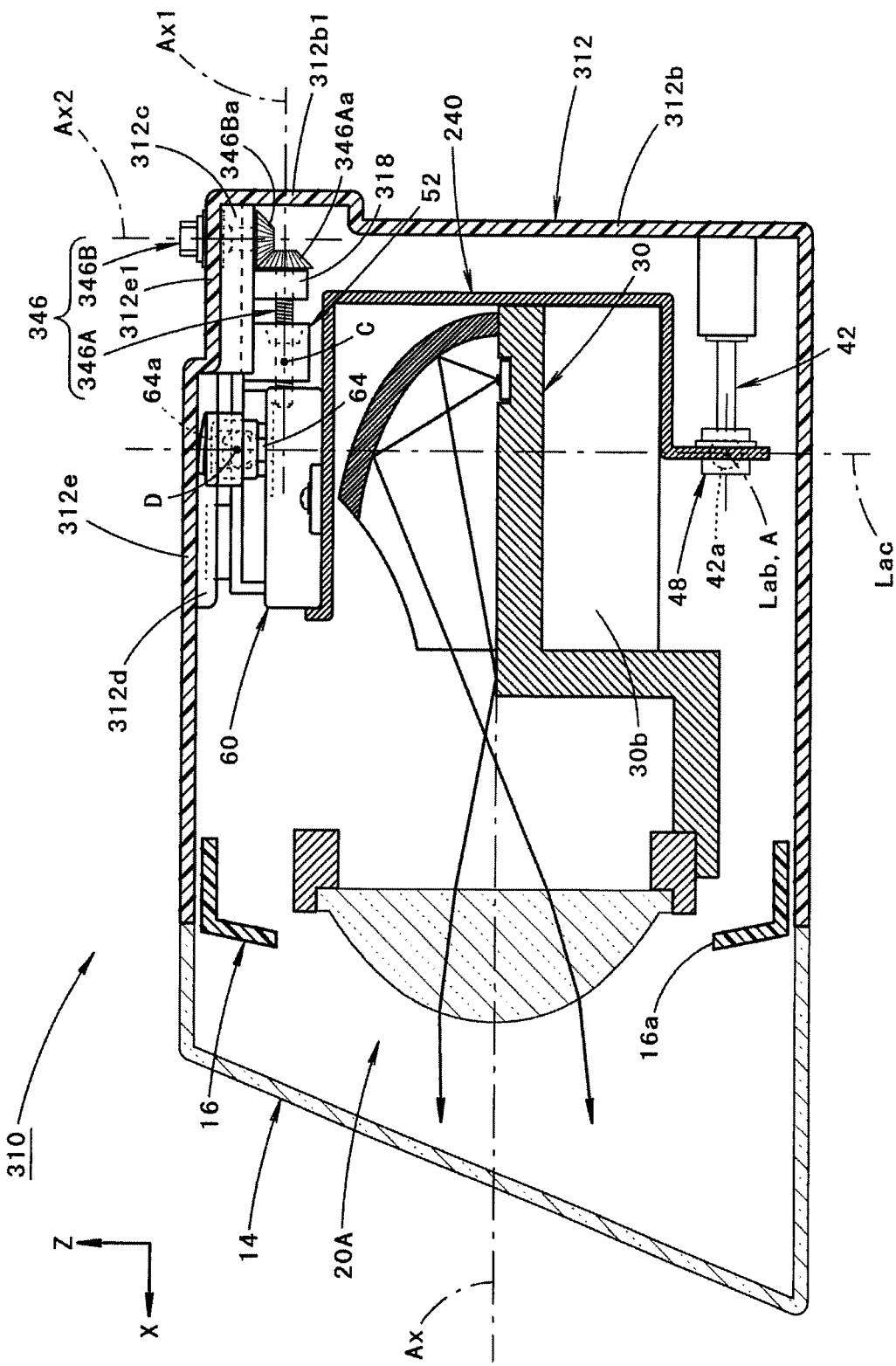
FIG. 11 is a view similar to FIG. 2, depicting a third modified embodiment of the illustrative embodiment.

FIG. 11 is a view similar to FIG. 2, depicting a vehicle lamp 310 of the third modified embodiment.

As shown in FIG. 10, the basic configuration of the vehicle lamp 310 is similar to the second modified embodiment. However, a configuration of an aiming screw 346 is different from the second modified embodiment, and a configuration of a lamp body 312 is also correspondingly different from the second modified embodiment.

That is, the aiming screw 346 of the third modified embodiment has a configuration where a screw main body part 346A extending in the front and rear direction of the lamp and a drive shaft part 346B extending in the upper and lower direction are coupled via a pair of bevel gears 346A*a*, 346B*a*.

The screw main body part 346A is disposed on the axis Ax1 extending in the front and rear direction of the lamp, like the aiming screw 46 of the second modified embodiment. The screw main body part 346A has a shape where a rear part of the aiming screw 46 of the second modified embodiment is cut, and the bevel gear 346A*a* is fixed to a rear end portion of the screw main body part.

Also in the case of the lamp body 312 of the third modified embodiment, a part, which is close to a rear surface wall 312b, of an upper surface wall 312e is formed as a step-down part 312e1, a lower surface of the step-down part 312a1 is formed with a pair of left and right slide engaging parts 312c, and a general part of the upper surface wall 312e of the lamp body 312 is formed with a bead 312d.

The step-down part 312e1 of the upper surface wall 312e is provided with a brace 318 configured to rotatably support the screw main body part 346A in the vicinity of the front of the bevel gear 346A*a*.

On the other hand, the drive shaft part 346B is disposed on an axis Ax2 extending perpendicularly to the axis Ax1, and is rotatably supported at an upper end portion thereof to the upper surface wall 312*d* of the lamp body 312. The bevel gear 346B*a* meshes with the bevel gear 346A*a* of the screw main body part 346A with being fixed to a lower end portion of the drive shaft part 346B*h*.

In the third modified embodiment, when the drive shaft part 346B of the aiming screw 346 is caused to rotate about the axis Ax2, the screw main body part 346A is rotated about the axis Ax1, so that the lamp unit 20A is aimed in the upper and lower direction.

In order to implement the arrangement of the aiming screw 346, the lamp body 312 of the third modified embodiment has a configuration where an upper part of the rear surface wall 312*b* is formed as a rearward protrusion 312*b*1 protruding toward the lamp rear-side with respect to the other general part.

Also in the third modified embodiment, it is possible to achieve the operational effects similar to the second modified embodiment.

Also, when the configuration of the third modified embodiment is adopted, it is possible to easily perform the aiming of the lamp unit 20A in the upper and lower direction by an operation from the above of the vehicle lamp 310.

In the meantime, the numerical values described in the illustrative embodiment and the modified embodiments thereof are just exemplary, and can be appropriately set to different values.

Also, the present disclosure is not limited to the configurations described in the illustrative embodiment and the modified embodiments and can adopt the diversely changed configurations.

In the present disclosure, the leveling actuator and the aiming nut are well designed as described above.

The aiming screw may be configured only by a part extending in the front and rear direction of the lamp inasmuch as it is supported to the lamp body to be rotatable about the axis extending in the front and rear direction of the lamp, or may have a configuration where a part extending in a direction intersecting with the front and rear direction of the lamp is coupled to the part extending in the front and rear direction of the lamp via a gear or the like.

The output shaft member is disposed to protrude upward or downward from the actuator main body. However, the output shaft member is not necessarily required to protrude just upward or downward. For example, the output shaft member may be disposed to protrude toward a direction inclined from a direction just above or just below inasmuch as it is within a range in which the leveling and the aiming in the upper and lower direction and the right and left direction are not to be disturbed.

The output shaft member is coupled to the aiming nut at the leading end portion thereof. However, the specific coupling structure is not particularly limited.

The coupling position of the leading end portion of the output shaft member and the aiming nut is not particularly limited inasmuch as it is distant in the right and left direction from a vertical surface including the axis.

The vehicle lamp of the present disclosure includes the leveling actuator for rotating the lamp unit in the upper and lower direction, independently of the rotation by the aiming. However, since the output shaft member of the leveling actuator is coupled at the leading end portion thereof to the aiming nut that is threadably engaged with the aiming screw for aiming the lamp unit in the upper and lower direction, the leveling can be performed by moving the output shaft member relative to the actuator main body in the front and rear direction of the lamp.

At this time, the output shaft member of the leveling actuator is disposed to protrude upward or downward from the actuator main body fixed and supported to the lamp unit and is not disposed in series with the aiming screw, unlike the related art. Therefore, it is possible to reduce a summed length of the leveling actuator and the aiming screw in the front and rear direction, so that it is possible to easily secure a space for disposing therein the leveling actuator.

Further, according to the present disclosure, the leading end portion of the output shaft member and the aiming nut are coupled at the position distant in the right and left direction from the vertical surface including the axis upon rotation of the aiming screw, following operational effects can be achieved.

That is, since the coupling position of the output shaft member and the aiming nut is offset in the right and left direction relative to the threadably engaged position of the aiming screw and the aiming nut, it is possible to increase a degree of arrangement freedom of the leveling actuator. Thereby, it is possible to easily secure the space for disposing therein the leveling actuator, in correspondence to the lamp configuration.

Like this, according to the present disclosure, it is possible to easily secure the space for disposing therein the leveling actuator in the vehicle lamp including the leveling actuator, in correspondence to the lamp configuration.

Also, according to the present disclosure, the coupling position of the output shaft member and the aiming nut is offset in the right and left direction relative to the threadably engaged position of the aiming screw and the aiming nut, so that it is possible to easily reduce a summed width of the leveling actuator and the aiming nut in the upper and lower direction.

In the above configuration, the aiming nut may be supported to the lamp body to be slidable in the front and rear direction of the lamp. Thereby, it is possible to prevent in advance a situation where when the aiming screw is rotated so as to aim the lamp unit in the upper and lower direction, the aiming nut also intends to rotate and an excessive force is thus applied to a coupled part with the output shaft member of the leveling actuator.

At this time, the aiming nut may be provided with elastic pieces for elastically pressing the aiming nut to the lamp body in the upper and lower direction at both left and right sides of the coupling position with the output shaft member. Thereby, even though the coupling position of the output shaft member and the aiming nut is offset in the right and left direction relative to the threadably engaged position of the aiming screw and the aiming nut, after the engaging state between the aiming nut and the lamp body is securely kept, the aiming nut can be caused to slide relative to the lamp body.

In the above configuration, the aiming nut may be provided with an elastic piece for elastically pressing the aiming nut to the lamp body in the right and left direction at a part positioned at an opposite side to the coupling position with the output shaft member with respect to the vertical surface including the axis. Thereby, following operational effects can be achieved.

That is, when the coupling position of the output shaft member and the aiming nut is offset in the right and left direction relative to the threadably engaged position of the aiming screw and the aiming nut, an external force of displacing the aiming nut in the right and left direction is applied as a result of leveling and aiming. However, since the aiming nut is elastically pressed in the right and left direction by the elastic piece, the displacement of the aiming nut can be restrained. Thereby, after the engaging state between the aiming nut and the lamp body is securely kept, the leveling and aiming can be performed.

Each of the elastic pieces may be formed integrally with the aiming nut or may be mounted to the aiming nut, as a separate member.

In the above configuration, the aiming nut may be provided with a stopper for preventing the aiming nut from rotating about the coupling position by a predetermined angle or greater through contact with the lamp unit, at a part positioned at an opposite side to the coupling position with the output shaft member with respect to the vertical surface including the axis. Thereby, following operational effects can be achieved in a lamp manufacturing process.

That is, when mounting the lamp unit to the lamp body after mounting the leveling actuator to the lamp unit and coupling the aiming nut to the output shaft member of the leveling actuator, it is possible to enable a posture of the aiming nut to enter a predetermined inclination angle range by the rotation restraining operation of the stopper for the aiming nut. Therefore, it is possible to easily threadably engage the aiming nut with the aiming screw supported to the lamp body.

The stopper may be formed integrally with the aiming nut or may be mounted to the aiming nut, as a separate member.

The leveling actuator of the present disclosure has the configuration where the output shaft member protrudes upward or downward from the actuator main body and is coupled at the leading end portion to the aiming nut. Therefore, the aiming nut can be formed with a concave part for fitting therein the leading end portion of the output shaft member, and the concave part can be configured to have an inner peripheral surface shape with which the leading end portion of the output shaft member fitted in the concave part can be relatively displaced in the upper and lower direction by a predetermined amount.

By adopting the above configuration, after preventing the excessive force from being applied to the coupled part of the output shaft member of the leveling actuator and the aiming nut, movement of the output shaft member in the front and rear direction of the lamp can be transmitted as rotation of the lamp unit in the upper and lower direction, so that the leveling and the aiming in the upper and lower direction can be smoothly performed. Also, by adopting the above configuration, it is possible to absorb a mounting error of each member.

At this time, the inner peripheral surface shape of the concave part of the aiming nut may be formed into a shape with which the leading end portion of the output shaft member fitted in the concave part can be relatively displaced in right and left direction by a predetermined amount. Thereby, even when the rotation central axis of the lamp unit upon the leveling or the aiming in the upper and lower direction extends in a direction inclined relative to a vehicle width direction in the front and rear direction, it is possible to easily prevent the excessive force from being applied to the coupled part of the output shaft member of the leveling actuator and the aiming nut. Also, by adopting the above configuration, it is possible to absorb the mounting error of each member.

What is claimed is:

1. A vehicle lamp comprising:
a lamp body;
a lamp unit supported to the lamp body to be aimable in an upper and lower direction and in a right and left direction; and
a leveling actuator configured to rotate the lamp unit in the upper and lower direction, independently of rotation by the aiming, and
wherein an aiming screw for aiming the lamp unit in the upper and lower direction is supported to the lamp body to be rotatable about an axis extending in a front and rear direction of the vehicle lamp,
wherein an aiming nut to be threadably engaged with the aiming screw is mounted to the aiming screw,
wherein the leveling actuator includes an actuator main body fixed and supported to the lamp unit and an output shaft member supported to the actuator main body to be moveable in the front and rear direction of the vehicle lamp in a state where the output shaft member is positioned to protrude upward or downward from the actuator main body, and
wherein a leading end portion of the output shaft member and the aiming nut are coupled at a position a distance in the right and left direction from a vertical surface that includes the axis.

2. The vehicle lamp according to claim 1, wherein the aiming nut is supported to the lamp body to be slidable in the front and rear direction of the vehicle lamp.

3. The vehicle lamp according to claim 2, wherein the aiming nut is provided with elastic pieces for elastically pressing the aiming nut to the lamp body in the upper and lower direction at both left and right sides of a coupling position with the output shaft member.

4. The vehicle lamp according to claim 1, wherein the aiming nut is provided with an elastic piece for elastically pressing the aiming nut to the lamp body in the right and left direction at a part positioned at an opposite side to a coupling position with the output shaft member with respect to the vertical surface including the axis.

5. The vehicle lamp according to claim 1, wherein the aiming nut is provided with a stopper for preventing the aiming nut from rotating about a coupling position by a predetermined angle or greater through contact with the lamp unit, at a part positioned at an opposite side to the coupling position with the output shaft member with respect to the vertical surface including the axis.

6. The vehicle lamp according to claim 1, wherein the aiming nut is formed with a concave part for fitting therein the leading end portion of the output shaft member, and
wherein the concave part has an inner peripheral surface shape with which the leading end portion of the output shaft member fitted in the concave part is capable of relatively being displaced in the upper and lower direction by a predetermined amount.

7. The vehicle lamp according to claim 6, wherein the concave part has an inner peripheral surface shape with which the leading end portion of the output shaft member fitted in the concave part can be relatively displaced in the right and left direction by a predetermined amount.

* * * * *